UNITED STATES PATENT OFFICE.

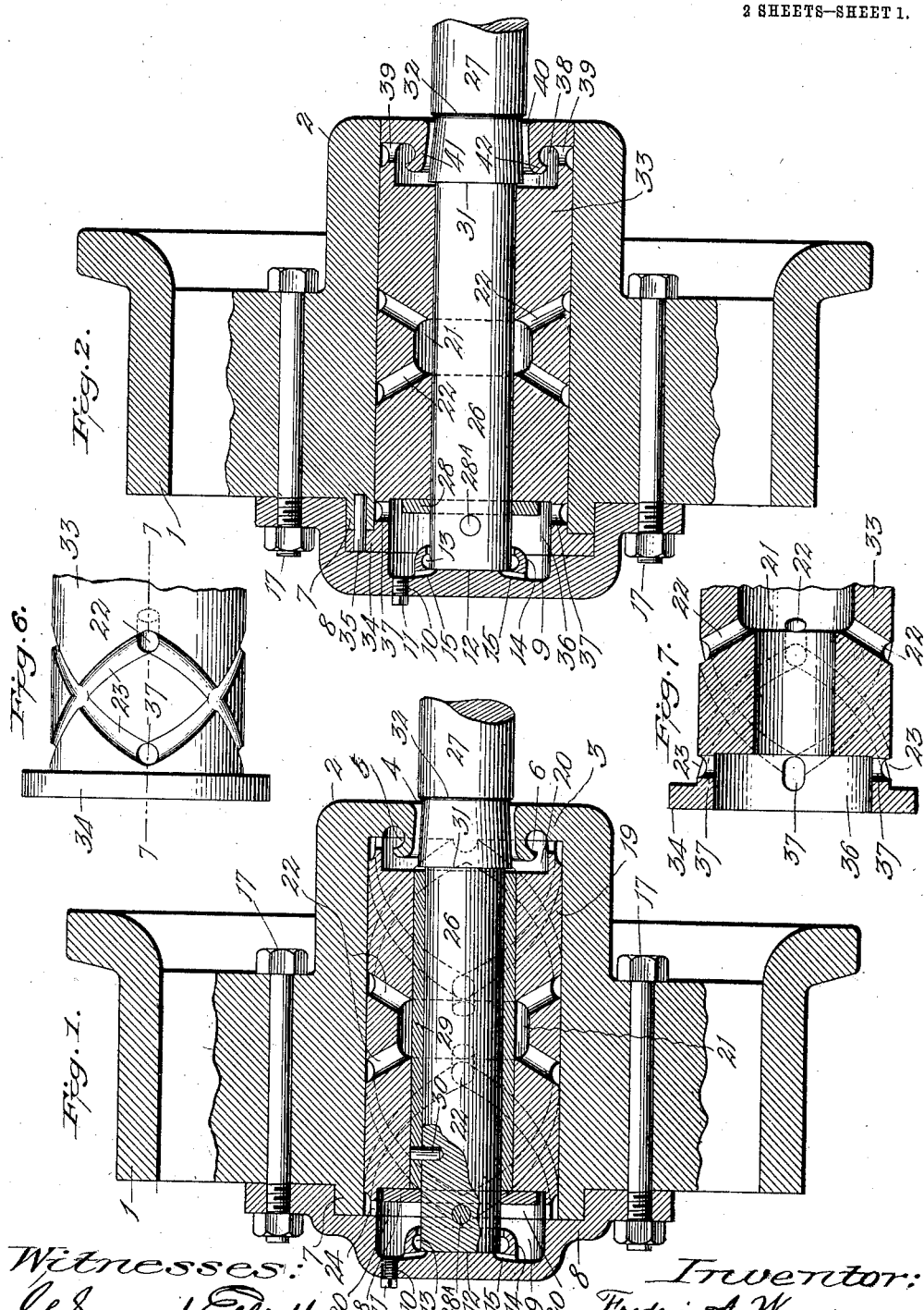

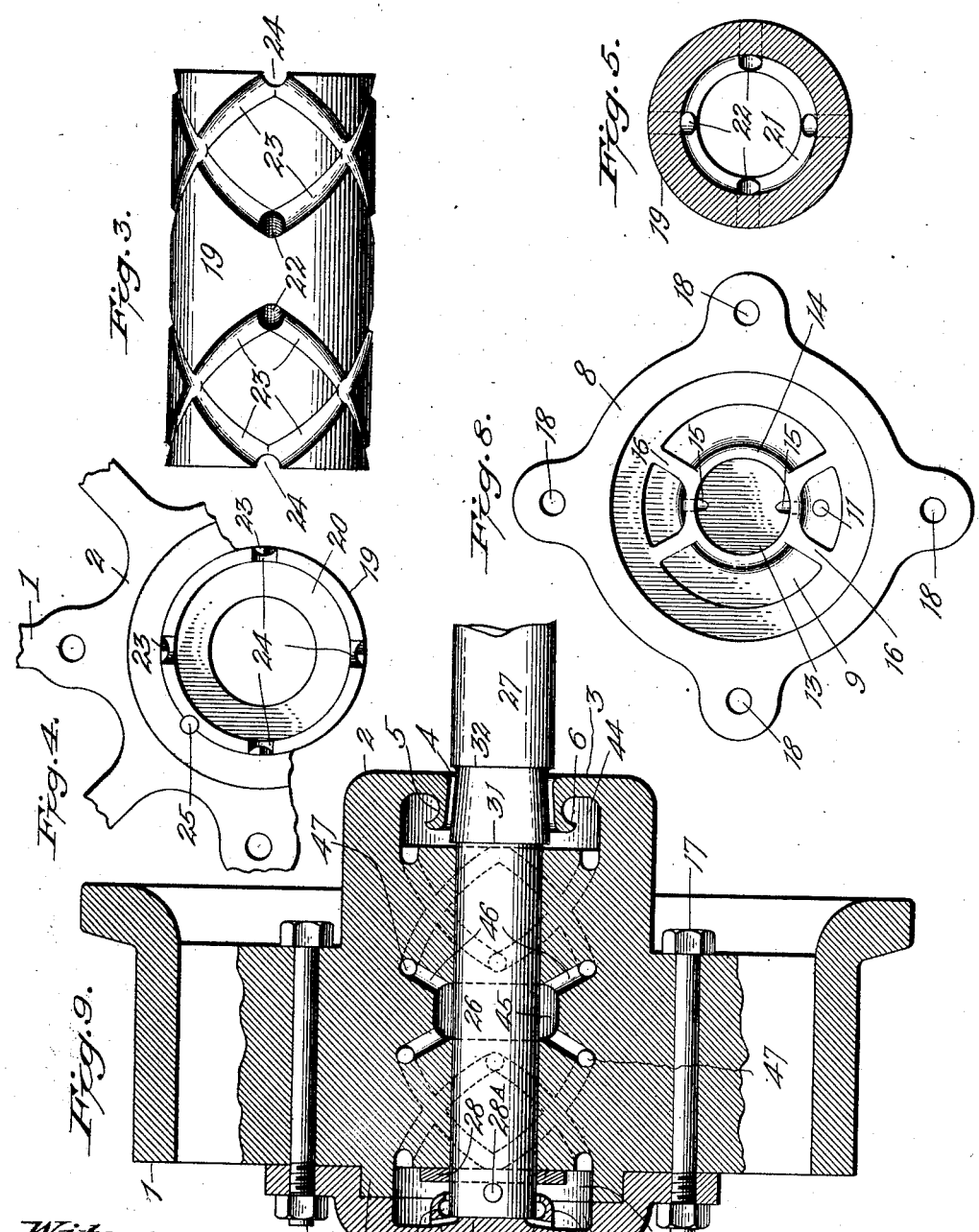

FREDERIC A. WARREN, OF CANON CITY, COLORADO.

CENTRIFUGAL OILING-BEARING FOR CAR AND OTHER WHEELS.

1,002,614.　　　　Specification of Letters Patent.　　Patented Sept. 5, 1911.

Application filed November 1, 1910. Serial No. 590,131.

*To all whom it may concern:*

Be it known that I, FREDERIC A. WARREN, a citizen of the United States of America, residing at Canon City, county of Fremont, and State of Colorado, have invented a new and useful Centrifugal Oiling-Bearing for Car and other Wheels, of which the following is a specification.

This invention relates to improvements in centrifugal oiling bearings for car and other wheels.

The object of the invention is to provide a practically dust-proof hub having an oil chamber at each end, an annular groove adapted to surround the axle spindle and substantially spiral channels or passages connecting the groove with the chambers, said chambers being of greater diameter than the spindle bearing, and said passages extending from the margin of the chambers, whereby oil supplied to the outer chamber flows by gravity through the passages to the inner chamber, and when the wheel is in motion, is driven by centrifugal action against the margin of said chamber and thence through the adjacent set of passages to the annular groove, whence it works over the axle spindle and also passes through the other set of passages to the opposite chamber, the outer end of said hub being provided with a removable cap having a central bearing surface, against which the outer end of the axle spindle is adapted to bear, said bearing surface being surrounded by an annular oil pocket which is adapted to inclose the said end of the spindle.

The invention further consists in the construction of the hub bearing as set forth in the accompanying drawings, in which, Figure 1 is a sectional view of a wheel embodying the preferred form of construction. Fig. 2 is a similar view showing a removable bearing sleeve which extends entirely through the wheel hub. Fig. 3 is a side view of the removable sleeve shown in Fig. 1. Fig. 4 is an end view of the sleeve and a portion of the wheel hub and showing a dowel pin for locking the sleeve to the hub. Fig. 5 is a central, transverse, sectional view through the said sleeve. Fig. 6 is a side view of a portion of the sleeve shown in Fig. 2. Fig. 7 is a longitudinal, sectional view thereof on the line 7—7 of Fig. 6. Fig. 8 is an inside front view of the cap used in connection with the different forms of my device; and Fig. 9 is a sectional view of a modified form of hub bearing, the oil passages connecting the opposite ends of the hub being formed in the hub instead of in a removable sleeve.

Referring to the accompanying drawings, the numeral 1 refers to a wheel such as is used on mining or other cars, though the invention is applicable to all other classes of vehicle wheels. The wheel is provided with a hub 2, which preferably projects a suitable distance beyond the inner face of the wheel and is closed at its inner end by a wall 3, which is provided with an axial hole 4, through which the axle spindle is passed. An annular projection or band 5 is formed on the inner face of the end wall 3, surrounding the hole 4, and this band terminates in a flange or rim 6, which is adapted to prevent the oil at this end of the hub from working out through the hole 4, as will be fully set forth hereinafter.

The outer end of the hub is formed with an annular rim 7, upon which fits a cap 8, which closes the outer end of the hub. The central portion of this cap extends outward a suitable distance and is hollow so as to form an oil chamber 9, which is supplied through an inlet hole 10, in the wall of the cap, said hole being normally closed by a screw 11. The central portion of the inner face of the wall of the cap is formed with a bearing surface 12, which is surrounded by an annular oil pocket 13, formed in a projecting band or rim 14, the inner face of which is grooved annularly to provide the pocket 13, as will be seen in Figs. 1, 2 and 9, the function of the bearing surface and oil pocket being to receive the outer end of the axle spindle, as shown. Holes 15, in the rim 14, form communication between the oil chamber 9 and the pocket 13, and ribs 16 extend from the pocket rim to the margin of the chamber 9, these ribs being adapted to catch the oil as the wheel revolves and convey it to the holes 15, whence it passes to the pocket 13, as will be understood by reference to Fig. 8. The cap 8 is secured upon the hub by bolts 17, which pass through the wheel spokes and through threaded holes 18 in ears formed on the marginal edge of the cap.

The invention contemplates a hub having an oil chamber at each end, a central annular distributing groove and passages connecting each chamber with the distributing groove. In carrying out this feature the diameter of the bore of the hub is made much greater than the axle spindle upon which the wheel is mounted, and a bearing sleeve is inserted in the hub bore, the bore of which forms the spindle bearing. This bearing sleeve is formed with the annular distributing groove and with the passages connecting said groove with the oil chambers at the ends of the hub. In its preferred form, this bearing sleeve 19 is constructed as shown in Figs. 1 and 3, and is of such length that when its inner end rests against the end wall of the hub its outer end is flush with the outer end of the hub. The ends of the sleeve are formed with circular recesses or chambers 20, which are preferably of the same diameter as the cap chamber 9, and about centrally of its length the bore of the sleeve is formed with an annular groove 21 from opposite sides of which equidistant inclined holes 22 extend through to the periphery of the sleeve. Preferably four of these holes extend from each side of the groove, as shown in Fig. 5, and each hole connects at its upper end with a pair of oil channels or passages 23, which are formed in the periphery of the sleeve and which extend in opposite directions a quarter of the distance around the sleeve and terminate at opposite points on the adjacent ends of the sleeve. There are thus four converging points on each end of the sleeve, at each of which points two oppositely extending channels unite and at these points the ends of the sleeve are recessed as shown at 24 to form communication between the said channels and the circular recesses in the ends of the sleeve so that the oil in the hub chambers may pass into the said channels. After the sleeve has been placed in the hub, it is held against rotation by a dowel pin 25, which is driven into a hole formed partly in the sleeve and partly in the hub. The spindle 26 of an axle 27 passes through the sleeve and its outer end extends into the oil pocket 13 and rests against the bearing surface 12 of the cap. A washer 28 is placed over the end of the spindle and rests against the adjacent end of the sleeve and a pin 28^A is passed through a hole in the spindle and rests against the washer, thus holding the wheel upon the spindle.

In Fig. 1 the spindle is provided with a jacket 29, which is secured thereto against either rotation or endwise movement by a pin 30. It is preferable to provide the spindle with a jacket, as the jacket when worn may be removed and replaced by a new one, thus saving the spindle from wear; nevertheless the jacket may be dispensed with if desired. The spindle terminates in a shoulder 31 at the inner end of the sleeve, from which point it tapers to a second shoulder 32, where the axle terminates. The hole 4 is also tapered, as shown, to correspond to the taper of the spindle, the tapered surface of the said hole preventing oil which might enter the hole from working out of the hub.

In Fig. 1 the wheel illustrated is a specially constructed wheel, while in Fig. 2 I have shown the bearing sleeve applied to a form of wheel in common use, or one in which the hub bore extends entirely through the same. In this construction the spindle may be jacketed, if desired, though the jacket is omitted in Fig. 2. The sleeve 33 in this form of bearing extends through the hub and is flush with its inner end. The opposite end of the sleeve is provided with a flange 34, which engages the outer end of the hub and holds the sleeve against endwise movement in one direction, while the cap 8, which is similar in construction to the cap shown in Fig. 1, holds the sleeve against endwise movement in the opposite direction, and it is held against rotation by a pin 35, which extends through a hole in the flange and into the end of the hub. This sleeve is provided with the oil distributing groove 21, the inclined holes 22 leading therefrom and the channels 23. A chamber 36 is also formed in the front end of the sleeve and holes 37 connect this chamber with the channels 23. A chamber 38 is formed in the opposite end of the sleeve and holes 39 connect the same with the channels 23 at that end of the sleeve. A tapered axle receiving hole 40 is formed in this end of the sleeve and through a projecting band 41, which terminates in a flange or rim 42 adapted to prevent the escape of oil through the hole 40. The axle spindle and its securing means, as well as the oil pocket in the cap, are the same as those shown in Fig. 1, and therefore require no separate description.

In Fig. 9 I have illustrated a modification of the invention in which the bearing sleeve is dispensed with and oil chambers 43 and 44 are formed in the front and rear ends respectively of the wheel hub, while an annular oil distributing groove 45 is formed in the bore of the hub, from which extend inclined holes 46 connected with pairs of channels 47, which extend to the oil chambers 43 and 44, the inclined holes 46 and channels 47 corresponding respectively to the holes 22 and channels 23 of Figs. 1 and 2. In all other respects this wheel is the same as that shown in these two figures.

In assembling the parts, the sleeve is partially inserted in the hub, its outer end projecting slightly beyond the adjacent end of the hub to permit of the insertion of the pin 28^A. The spindle is then passed through the sleeve, and the washer 28 is slipped upon its outer end and against the end of the sleeve and the pin 28^A is inserted in the hole in the spindle in front of the washer.

In the form shown in Fig. 1 the pin 28ᴬ is passed down through one of the recesses 24 in the end of the sleeve, while in the sleeve shown in Fig. 2 the pin 28ᴬ is passed down through one of the oil holes 37, which may be slightly enlarged for the purpose, as shown in Fig. 7. After the insertion of the pin 28ᴬ, the sleeve is pushed all the way into the hub and secured thereto by the dowel pin, as described above, and the cap 8 is then bolted to the end of the hub, the end of the spindle bearing against the bearing surface 12 of the cap and surrounded by the oil pocket 13. The chamber 9 is then supplied with oil through the inlet hole 10 and the oil passes through the apertures in the ends of the sleeve to the grooves or chambers 23, whence it passes to the distributing groove 21, and a portion of it works around the spindle and a portion passes through the other channels 23 to the chamber at the opposite end of the hub. Under centrifugal action the oil is thrown against the marginal walls of the oil chambers and through the apertures therein to the channels and the substantially spiral arrangement of these channels causes the oil to be directed inward toward and into the distributing groove; and thus while the wheel is in motion the oil is kept constantly moving from the chambers to the distributing groove and over the spindle to the chambers, thereby keeping the spindle constantly supplied.

Having described my invention, what I claim as new and desire to secure by Letters Patent is:

1. In an oiling bearing as specified, a hub, a removable cap on the outer end of the hub having an oil chamber therein, a central, annular oil pocket in the chamber, and holes connecting the chamber and pocket, a spindle in the hub, the forward end of which extends into the oil pocket and against the cap, and means including a pin for holding the spindle in the hub, said hub being provided with an oil chamber at its inner end surrounding the spindle, an annular distributing groove surrounding the spindle mid-way between the chambers and spirally arranged intersecting channels connecting the chambers and distributing groove.

2. In an oiling bearing as specified, a hub, a removable cap on the outer end of the hub having a central, annular oil pocket therein, a chamber surrounding the oil pocket and holes connecting the pocket and chamber, a spindle extending through the hub, the end of which enters the oil pocket and rests against the cap, a washer on the spindle against the hub and a pin passing through the spindle in front of the washer, said hub having an annular oil chamber at its inner end surrounding the spindle, an annular groove surrounding the central portion of the spindle, channels connecting the said groove and end chambers, and a flanged band in the chamber at the inner end of the hub which surrounds the spindle.

3. In an oiling bearing as specified, a wheel hub, a removable cap on the outer end of the hub, a bearing sleeve rigidly secured in said hub, oil chambers being arranged at opposite ends of the hub which are formed partly in the ends of said sleeve, a spindle extending through the sleeve and bearing against the cap, means for retaining the spindle within the sleeve, and an annular oil pocket surrounding the end of the spindle and provided with holes communicating with the surrounding oil chamber, said bearing sleeve having an annular groove in its bore, holes extending from said groove to the periphery of the sleeve and channels connecting said holes with the chambers at the opposite ends of the hub.

4. In an oiling bearing as specified, a wheel hub, a removable cap on the outer end of the hub, a bearing sleeve rigidly secured in the hub, oil chambers being arranged at opposite ends of the said sleeve, a spindle extending through the sleeve and bearing against the cap, means for retaining the spindle within the sleeve, and a removable jacket surrounding the spindle, said bearing sleeve having an annular oil groove in its bore, inclined holes extending in opposite directions from opposite sides of the groove to the periphery of the sleeve, and spiral channels in the periphery of the sleeve extending from the said holes to the oil chambers at the ends of the sleeve.

5. In an oil bearing as specified, the combination with a wheel having a hub which extends beyond one side of the same, of a bearing sleeve rigidly secured in said hub, a cap on the outer end of the hub a spindle extending through the rear end of the hub and abutting against the cap, oil chambers being provided at opposite ends of the sleeve and formed partly therein, a projecting flanged band surrounding the spindle in the chamber at the rear end of the hub, the spindle being tapered at this point and the surrounding hole correspondingly tapered, and means for retaining the spindle within the sleeve, said sleeve being provided in its bore with an annular oil groove, a plurality of inclined holes extending in opposite directions from opposite sides of the groove to the periphery of the sleeve, and spiral channels extending from each series of inclined holes to the oil chambers at the opposite ends of the sleeve.

6. In an oiling bearing as specified, a hub, a removable cap on the outer end of the hub having an oil chamber therein, a central annular oil pocket in the chamber and holes connecting the chamber and pocket, a band projecting from the wall of the inner chamber, having a tapered axial hole, a spindle extending into said hub, the forward end of which extends into the annular oil pocket in the cap, and a tapered portion on said spindle corresponding to the said tapered axial hole, said hub having spiral passages connecting the oil chambers in the ends of the hub.

7. In an oiling bearing as specified, a hub, a removable cap on the outer end of the hub having an annular oil chamber therein, an axial oil pocket in said chamber having holes connecting the said pocket and chamber and radial ribs adapted to guide oil into said holes, a chamber at the opposite end of the hub, a flange band projecting inward from the wall of said chamber having a tapered axial bore which extends through said wall, a spindle extending through the hub and into the pocket in the cap, said hub having spirally arranged passages which connect the said oil chambers.

8. In an oiling bearing as specified, the combination with a hub having an oil chamber in its inner end, of a cap on the outer end of the hub having an oil chamber, an axial pocket in said chamber, holes connecting the pocket and chamber, and radial ribs adapted to guide oil into said holes, a spindle in said hub, the end of which extends into the axial pocket, and means surrounding the spindle at the rear end of the hub for preventing oil from working out of said hub.

In testimony whereof I affix my signature in presence of two witnesses.

FREDERIC A. WARREN.

Witnesses:
G. SARGENT ELLIOTT,
ADELLA M. FOWLE.

---

Copies of this patent may be obtained for five cents each, by addressing the "Commissioner of Patents, Washington, D. C."